United States Patent [19]

Ward

[11] Patent Number: 5,517,961
[45] Date of Patent: May 21, 1996

[54] ENGINE WITH FLOW COUPLED SPARK DISCHARGE

[75] Inventor: Michael A. V. Ward, Arlington, Mass.

[73] Assignee: Combustion Electromagnetics, Inc., Arlington, Mass.

[21] Appl. No.: 395,106

[22] Filed: Feb. 27, 1995

[51] Int. Cl.$^6$ .................. F02B 23/08; F02P 3/06
[52] U.S. Cl. .................. 123/307; 123/309; 123/169 EL; 123/661; 123/598
[58] Field of Search .................. 123/262, 260, 123/307, 309, 169 EL, 430, 598, 620, 661

[56] References Cited

U.S. PATENT DOCUMENTS

| | | | |
|---|---|---|---|
| 2,305,208 | 12/1942 | Trammell, Sr. et al. | 123/309 |
| 3,292,606 | 12/1966 | Ervin | 123/169 EL |
| 4,124,003 | 11/1978 | Abe et al. | 123/169 EL |
| 4,324,214 | 4/1982 | Garcea | 123/309 |
| 4,508,073 | 4/1985 | Hofbauer et al. | 123/309 |
| 4,841,925 | 6/1990 | Ward | 123/169 EL |
| 4,974,559 | 12/1990 | Nagaoka | 123/309 |
| 5,211,147 | 5/1993 | Ward | 123/661 |
| 5,445,135 | 8/1995 | Feuling | 123/661 |

Primary Examiner—Willis R. Wolfe
Attorney, Agent, or Firm—Jerry Cohen

[57] ABSTRACT

An improved spark ignition engine system producing a large continuous, centrally directed, flow coupled ignition spark discharge through combustion chamber (1), piston (4), inlet system (28/29), spark plug (5), and ignition spark discharge (26) design, and through the location and orientation, with respect to the mixture flow field, of a special design firing end and gap (7/9) of a spark plug fired with a spark discharge of hundreds of watts of power for hundreds of microseconds without spark segmentation or spark break-up by the flow field of up to about 20 m/sec flow velocity, with bulk flow occurring at the spark plug site at most engine speeds including low speeds to produce a very large centrally directed spark-initial flame front kernel which allows for substantial dilution of the mixture and significant reduction in engine cycle-to-cycle variation under most operating conditions of the engine including low speed light load.

30 Claims, 4 Drawing Sheets

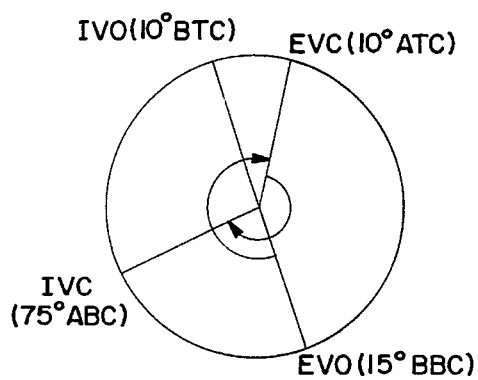
FIG. 8
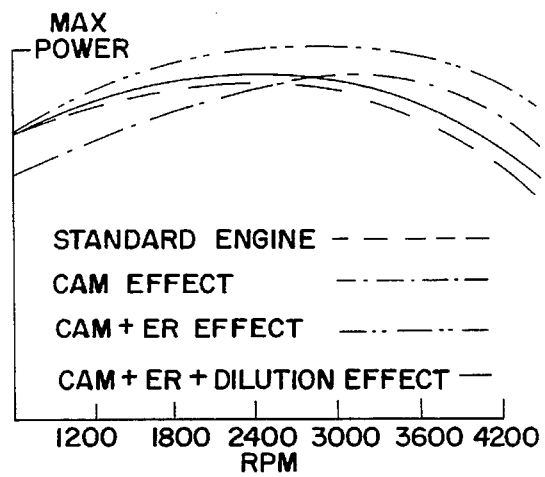
FIG. 9
| RPM | IGT(WOT) | PRESSURE* WOT, IGT | U piston @ IGT | V squish @ IGT | AFR/GFR LIGHT LOAD | AFR/GFR MEDIUM LOAD | AFR/GFR WOT |
|---|---|---|---|---|---|---|---|
| 600 | 10° | 8 BAR | .5m/sec | 4m/sec | 20:1 / 20:1 | | |
| 1500 | 20° | ~8 BAR | 2.3m/sec | 7m/sec | 24:1 / 24:1 | 26:1 / 26:1 | 15:1 / 16:1 |
| 3000 | 30 | ~8 BAR | 7m/sec | 8m/sec | 26:1 / 26:1 | 15:1 / 21:1 | 15:1 / 17:1 |
FIG. 10

ENGINE WITH FLOW COUPLED SPARK DISCHARGE

BACKGROUND OF THE INVENTION AND PRIOR ART

Current design spark ignition engines locate the spark plug firing end in regions of relatively quiescent in-cylinder air flow. In the increasingly popular 4-valve pent-roof combustion chamber, and in hemi-head engines, the spark plug is located at the center of the cylinder head where the air flows are minimum. Likewise, in the wedge type engine combustion chamber, which is widely used in automobiles worldwide, the spark plug is located at or near the apex of the cylinder head wedge where the air flows are relatively low. The commonly cited reason for doing this is to locate the plug in a more central location in the combustion chamber. However, the not well publicized reason for doing this is to compensate for the conventional Kettering ignition's inability to sustain a spark discharge under high air-flow conditions that may occur at other locations in the combustion chamber. Under high air flows, the Kettering spark segments according to the phenomenon of "multiple sparks in intense bulk flow" to compromise igniting ability. This phenomenon appears, for example, in engines using air-flow tumble, i.e. vertical vortex flow, where high flow can occur at the conventional spark plug site during ignition at high engine speeds, to break-up (segment) the spark discharge and compromise the igniting ability of the spark. Since ignition capability is believed to be determined by the first spark segment under high flow conditions, then the subsequent spark segments are wasted and not available for ignition, compromising total available spark energy, especially of difficult to ignite dilute mixtures which require more spark power and energy. Hence, the spark plug is moved from more ideal locations described herein or the engine flow is compromised to accommodate the ignition's low tolerance for high flows, with spark segmentation occurring for the glow discharge of the standard Kettering and High Energy Ignition (HEI) at flow velocities as low as a few hundred feet/minute (fpm), or one to two meters/second (m/sec).

SUMMARY OF THE INVENTION

On the other hand, in the present invention, there is disclosed an engine flow coupled spark ignition system comprising a high flow combustion chamber, a flow-designed spark plug means, and an ignition system capable of sustaining a spark discharge under high flow conditions well over 1000 fpm, in which the special design spark plug firing end is located within the high flow region of the engine cylinder during ignition firing to produce a large ignition/initial-flame kernel to support combustion of difficult to ignite dilute mixtures, such as lean mixtures and high EGR mixtures, from idle speeds where the relatively high flow may be produced at the spark plug site by cylinder squish which is near its maximum at the ignition timing of 6 to 24 degrees before top center (BTC), to higher speeds where high flow can be induced at the more advanced ignition timing (where squish is lower but piston velocity higher) by piston motion, and/or intake runner induced air motion. In essence, a system is provided which not only is not compromised by high flows in the combustion chamber, but which makes use of the potential improved igniting ability of the high flow/high turbulence environment to create a large ignition/initial flame kernel of a high power high energy ignition to improve dilute combustion capability and ignition, from low speed where the high flow is intentionally produced to high speed conditions where flow velocities are naturally high due to high piston speeds.

In the present invention the spark plug end is designed and located with respect to the piston and intake runner/valve induced air motion such that, when used with an ignition with a flow-sustainable spark discharge and high power and energy delivery capability, the air-fuel mixture flow and spark discharge interact to produce what is termed as a "flow coupled spark discharge" which is characterized by a very large spark/initial flame kernel with a specific direction to produce a very repeatable and large initial flame front for minimum cycle-to-cycle variation and maximum engine dilution capability.

The ignition employed to achieve this result is one with an arc discharge characteristic (versus conventional glow discharge), notably a hybrid capacitive-inductive ignition system disclosed in my U.S. pending patent application Ser. Nos. 08/148,554 and 08/206,632, which has an essentially DC "arc" discharge of at least one amp peak spark current and with a high peak voltage of 36 to 42 kilovolts (kV) to allow for a relatively larger spark gap and better coupling to the high flow, highly turbulent air-fuel mixture. The spark plug end is generally of the toroidal gap type disclosed in the above patent applications but with more extended and shaped central plug tip to better couple to the flow and to create an arc runner for the spark to move along in the direction of the air-fuel mixture flow to produce a more extensive spark-initial flame front kernel.

Therefore, a principal object of the present invention is to modify the combustion chamber of a conventional spark ignited piston engine and locate a new design spark plug in the region of relative high engine flow and to reshape, as required, the piston, cylinder head, and intake system (intake runner and valve) to produce relatively high flows in a fairly consistent direction at the spark plug site during ignition firing and to supply high ignition power of the arc discharge type of at least 100 watts for a suitable ignition time duration of hundreds of microseconds to produce an essentially continuous spark discharge which does not become segmented under high flow conditions and under normal operating engine conditions to produce a large spark discharge and large initial flame front kernel where up to one hundred or more millijoules can be delivered to the spark ignition-initial flame front kernel.

A further object of the present invention is to design the overall system in terms of flow patterns and ignition timing with respect to engine speed and dilution level such that under most normal operating engine conditions higher directed flow velocities occur at the spark plug site at the time of ignition without extreme variations in air-flow velocities.

Another object of the invention is to reshape the combustion chamber to produce air-fuel mixture squish and to locate the spark plug tip at or near the squish zone, at a more central region of the squish zone, such that at idle and low engine speeds when flows and turbulence are normally low there will occur relatively higher air-flows at the spark plug site at the time of ignition (which will typically range in the 5 to 20 degree BTC range at idle speeds) such that a large spark-initial flame front kernel or flow coupled spark discharge occurs so that one can reliably burn a more dilute mixture strength, i.e. a mixture strength with a higher air-fuel ratio (AFR) and higher gas fuel ratio (GFR).

Another object is to design the engine squish by placing the combustion chamber mainly in the piston (as in a shallow bowl-in-piston design) for a more compact combustion chamber and improved location of the spark plug near the high squish zone with an orientation of the spark gap relative to the squish flow which is more perpendicular than parallel, and with the squish and other flows designed with respect to the combustion chamber such the air flows enhance vaporization of the fuel, especially during cold start.

Another object is to design the engine with late intake valve closure, e.g. 75 degrees after bottom center (ABC), for lower compression ratio (CR) and reduced part-throttle pumping loss, and with a speed timing advance curve (partly or totally compensating for the higher volumetric (air-breathing) efficiency at higher speeds) controlled in part on the mixture strength (AFR and GFR) and in part by the flow speed design such that the air density at ignition timing is approximately constant and somewhat lower than normal at wide-open-throttle (WOT) for the entire speed range so that a larger spark gap can be employed, and to further have a high expansion ratio (ER), e.g. 12:1 ER or greater, to effect higher engine efficiency despite the lower effective compression ratio e.g. 8:1 CR, to provide an effective CR of 9:1 or greater for purposes of calculating engine efficiency.

Another object of the invention is to design the intake porting and valve such that ramble type flow occurs which reinforces any squish flow that may be present to create a flow direction under most operating conditions of the engine which sweeps the mixture through the spark gap (at a more perpendicular than parallel direction relative to the spark gap) towards a more central region of the combustion chamber for improved flow coupled spark discharge and ignition of the mixture.

Another object is to provide a spark plug end and tip such that it presents a spark gap to the flow that is not interrupted or masked by extraneous electrodes and such that the spark discharge maintains itself in the gap region where the flow traverses the gap and becomes stretched without restriking at an interior more quiescent region of the plug where the gap is designed to be substantially larger than the designed flow traversed spark gap.

Another object is provide a spark gap of the annular or circular gap with the gap essentially more perpendicular than parallel to the typical flow direction.

Another object is to design the spark plug with a high heat conductivity central conductor material, e.g. copper, and dimension it and heat sink it to the spark plug casing such that it efficiently draws away heat from the central spark plug tip (during ignition and combustion) which is preferably made of high erosion resistant material such as tungsten-nickel-iron.

Another object is to design the entire plug end such that the spark has a strong preference to strike at its furthermost end within the flow region and not at more interior regions where it can cause spark plug fouling or inhibit spark discharge coupling to the flow field.

Other features and objects of the invention will be apparent from the following detailed description of preferred embodiments taken in conjunction with the accompanying drawings.

BRIEF DESCRIPTION OF THE DRAWINGS

FIG. 8 is a preferred engine valve timing to be used with the present invention.

FIG. 9 is a plot of maximum engine power as a function of engine speed for the four cases of a typical standard engine, for such an engine modified with the cam design of FIG. 8, with in turn a higher expansion ration (ER), and finally with a dilution strategy to achieve essentially the same or slightly higher maximum power as the conventional engine but with higher levels of exhaust dilution, especially at higher speeds and WOT stoichiometric operation.

FIG. 10 is a table showing for three typical engine speeds, idle, low speed, and moderately high speed, the preferred air density behavior, the preferred typical squish velocity and resulting overall flow velocity, and a typical preferred air-fuel and gas-fuel ratio strategy for the proposed engine.

DESCRIPTION OF PREFERRED EMBODIMENTS

Figure 1A:
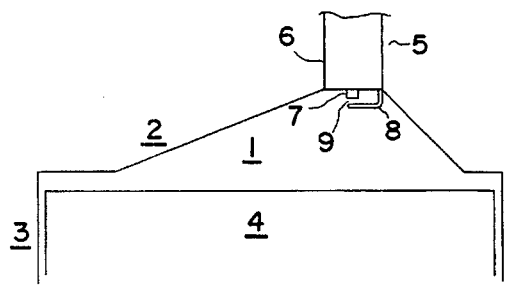
FIGS. 1a and 1b are partial side view drawings of two conventional types of engine cylinders showing the recessed position of the spark plug.
Figure 1B:
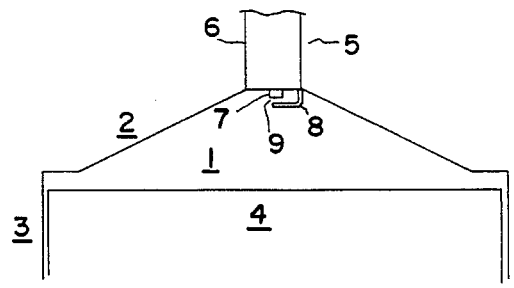

FIGS. 1a and 1b are partial side view drawings of two conventional types of engine cylinders showing the recessed position of the spark plug. FIG. 1a is a drawing of the widely used asymmetrical wedge type combustion chamber 1 located mainly in the cylinder head 2 and defined by the cylinder head 2, the cylinder walls 3, and the piston 4. At the apex of the cylinder head, in the region of relative quiescent air-motion, is the conventional spark plug 5 with outer grounded shell 6, high voltage center electrode 7, and ground electrode 8.

FIG. 1b is a drawing of the conventional more symmetrical pent-roof type combustion chamber with the centrally located spark plug at the apex of the pent-roof at the region of relative quiescent air-motion or air-flow. Like numerals represent like parts with respect to FIG. 1a. Like the case of FIG. 1a the combination of combustion chamber in the cylinder head and centrally located spark plug minimizes the air-flow at the spark plug site during ignition except in engines with "tumble" or "vertical vortex" flow. However, with tumble flow the flow velocity is low near piston top center (TC) since the organized motion has been essentially totally converted to random motion (turbulence), and the flow velocity is strongly speed dependent. It is low during ignition at idle and low speeds (where greater flow is desired according to the present invention to improve dilution combustion capability), and it is higher than necessary at high speeds both due to the more advanced timing at ignition and due to the higher piston speeds producing higher average air motions in the cylinder.

Figure 2A:
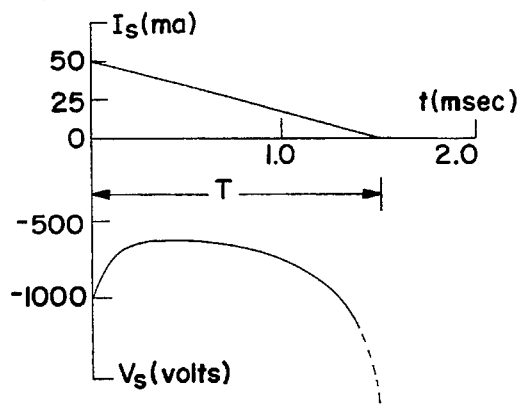
FIGS. 2a and 2b are voltage and current spark discharge characteristics under relatively quiescent conditions for the conventional Kettering type ignition and the conventional capacitive discharge (CD) ignition respectively.
Figure 2B:
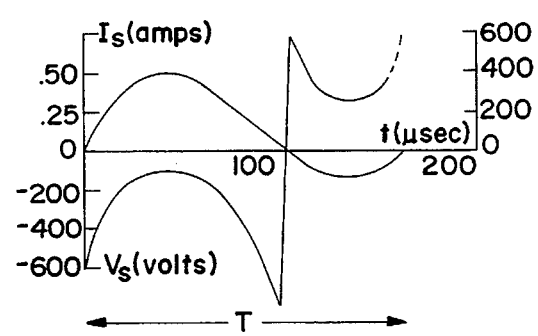

FIGS. 2a and 2b depict voltage and current spark discharge characteristics under relatively quiescent conditions for the conventional Kettering type ignition, showing the DC spark with a falling triangular distribution, and the conventional capacitive discharge (CD) ignition with an oscillating decaying spark discharge. In both cases the spark energy is successfully delivered to the spark gap although both the spark power and total energy delivered to the mixture is low, i.e. in the range of 5 to 50 watts and a 5 to 25 millijoules (mj) of energy. The spark discharge voltage Vs is higher for the low current Kettering inductive spark discharge of tens of milliamps spark current Is, typically around and over 500 volts except that approximately 350 volts of that is dropped at the electrodes to maintain the glow discharge (and not delivered to the spark plasma in the spark gap 9 (FIGS 1a, 1b). Conversely, for the higher spark discharge current of the CD system of in the range of a fraction of an amp up to and over an amp (½ amp peak shown), the spark discharge voltage is low, i.e. around 100 volts, with typically 30 volts drop at the electrodes. Conventional CD ignition typically have low discharge efficiencies of approximately 10% versus 20% for inductive discharge at quiescent engine conditions, a major shortcoming leading to a rapid decay of the oscillatory spark discharge (which may not last beyond the first half oscillation). The term "approximately" as used herein means within plugs or minus 25% of the quantity that it qualifies.

Figure 3A:
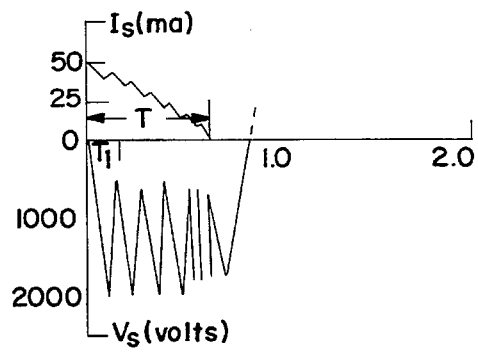
FIGS. 3a and 3b are the discharge characteristics of FIGS. 2a and 2b respectively under higher flow conditions showing segmentation of the spark.
Figure 3B:
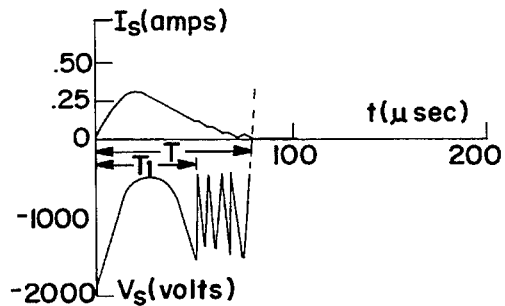

FIGS. 3a and 3b are the discharge characteristics of FIGS. 2a and 2b under moderate air flow conditions showing segmentation, or breaking up, of the spark discharge. This is apparent from the spark discharge voltage, which for FIG. 3a is shown to rise to about 2 kilovolts (kV) and drops rapidly to a few hundred volts in a time T1 of the total spark duration T, and repeats the pattern. This phenomenon, called "multiple sparks in intense bulk flow", is due to the stretching of the spark kernel beyond the spark gap 9 with increasing discharge voltage until the voltage required to sustain the discharge is greater than that required to restrike the spark at the original spark site, and the ignition voltage (at the high voltage electrode 7) restrikes a spark with consequent sharp drop of discharge voltage Vs which can no longer sustain the original stretched spark which then extinguishes. This effect occurs at bulk flow velocities as low as a few hundred feet per minute (fpm), or about 1 meter/ second (m/sec), where the term "about" means between ½ and 2 times the quantity it qualifies.

In the case of FIG. 3b the onset of spark segmentation occurs at a relatively later time in its discharge cycle when the spark current drops to the level of the glow discharge (around 100 milliamps (ma)). At the higher currents of the arc discharge the voltages needed to sustain the discharges are lower, and hence the voltage required to restrike the spark discharge is not attained (even though this restrike voltage may be lower than that of the glow discharge).

Figure 4A:
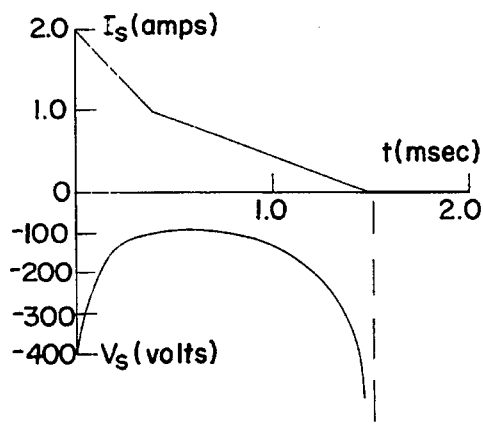
FIGS. 4a and 4b are spark discharge characteristics under relatively quiescent and high flow conditions respectively of the preferred hybrid ignition system disclosed in the cited patent applications.
Figure 4B:
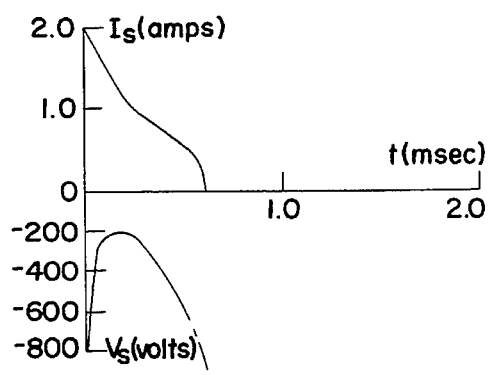

FIGS. 4a and 4b show the spark discharge characteristics under relatively quiescent and moderate flow conditions respectively of the previous cases for the preferred hybrid dual discharge ignition system disclosed in the cited patent applications. The spark discharge is a hybrid of the capacitive and inductive ignition in that it has the high current of a CD system and the long duration DC discharge of the inductive ignition at the high (and even higher) discharge efficiency of the inductive system. Its high efficiency and strong DC discharge makes it much more immune to bulk flow spark segmenting, about ten times more immune than the Kettering glow discharge ignition and significantly more immune than conventional CD systems. The ignition can tolerate ten times the flow velocity without segmenting and can deliver, under high flow conditions, ten times the power levels and useful energy relative to the Kettering ignition, e.g. 500 to 1000 watts and 100 to 200 mj (for 250 mj to 400 mj stored energy).

Figure 5:
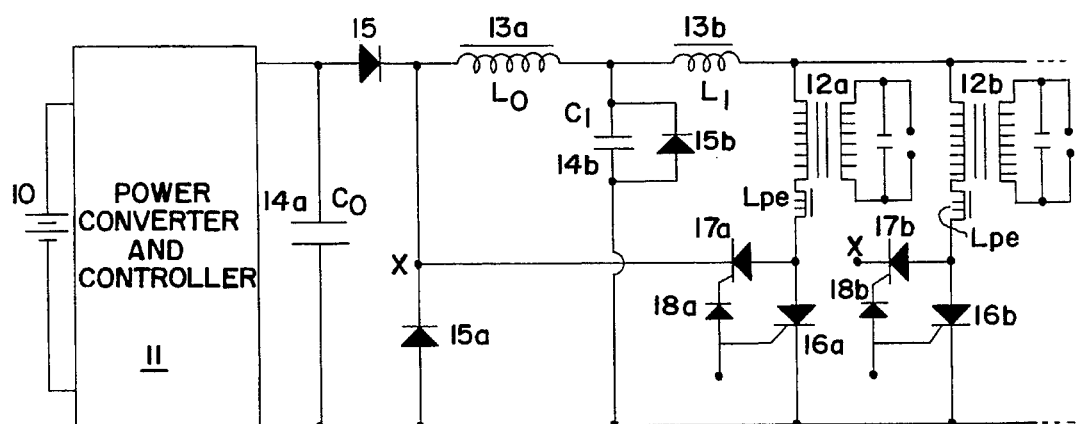
FIG. 5 is the preferred ignition circuit of the above cited preferred hybrid ignition system.

FIG. 5 is the preferred ignition circuit of the above cited preferred hybrid ignition system. It comprises a power supply (battery 10 shown), a high efficiency power converter 11, ignition coils 12a, 12b, . . . of "n" coils of an assumed distributorless ignition, low and high frequency inductors 13a (L0) and 13b (L1) which operate respectively with the low and high frequency capacitors 14a and 14b which have shunting diodes 15a and 15b across them, and isolation diode 15 which prevents charge from capacitor 14b flowing back to capacitor 14a. Coils 12a, 12b, . . . , are preferably stress-balanced coils with leakage inductance Lpe. The initial high frequency discharge circuit is defined by capacitor 14b (C1), inductor 13b (L1), and one of the coils, e.g. 12a (its primary winding of inductance Lp and leakage inductance Lpe), and switch 16a (SCR shown). The low frequency circuit is defined by capacitor 14a (C0) and inductor 13a (L0). Following triggering of SCR switch 16a and discharge of capacitors 14a, 14b (which are not allowed to go negative), shunt switch 17a begins to conduct to produce the DC decaying current distribution shown in FIGS. 4a, 4b. Diode 18a is a high voltage hold-off diode. The switch 16a, 17a, 18a is designated as a dual switch Si/SDi, where i=1 for coil 12a, i=2 for coil 12b (with dual switch components 16b, 17b, 18b). The size of the capacitors and voltage rating depend on the application, ranging from a stored energy of over 100 mj to as high as 1000 mj or higher in unusual applications. Parameters for a typical automotive application are given in the cited patent applications.

Figure 6A:
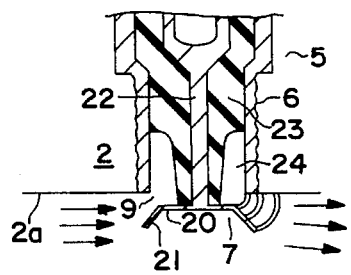
FIGS. 6a and 6b are partial cross-sectional side views of an approximately to-scale and enlarged drawing respectively of the preferred spark plug end for use as part of the present invention.

FIG. 6a depicts a partial cross-sectional side view of an approximately to-scale and enlarged drawing respectively of a preferred spark plug end for use as part of the present invention preferably with the dual discharge hybrid ignition of FIG. 5. Like numerals represent like parts with respect to FIGS. 1a and 1b. In the figure is shown a preferred 18 mm spark plug (versus the more common 14 mm plug) which is better suited for the purposes of the present invention. One main feature of the plug is the high voltage end section 7 which comprises a generally disc shape with an essentially flat disk section 20 essentially parallel to the cylinder head interior surface 2a and extending down beyond the cylinder head surface forming a circular spark gap 9, and an arc runner section 21 at 30 to 60 degrees to the disk section 20 and oriented away from the cylinder head surface 2a. Center conductor 22 is insulated with tapered end section ceramic 23 defining a plug recess volume 24. Ceramic end section 23 extends beyond the threaded shell section 6 right up to the disk 20. Center conductor 22 is well-heat sunk and made of thermally conductive material such as copper to keep the center electrode tip 20/21 from over heating and becoming damaged.

Figure 6B:
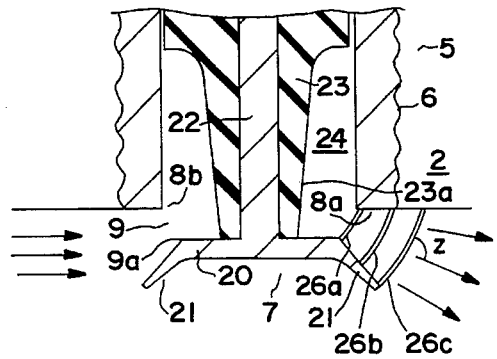

FIG. 6b is an approximately twice scale, more detailed drawing of the end section of FIG. 6a, showing the ground electrode made up of the end of the threaded plug portion 8a whose inner edge 8b forms the spark gap with the edge 9a of the intersection of the disc 20 and runner 21, with the plug end 8a and the inner cylinder head surface 2a at the plug site being the other surface along which the spark can run or move. The spark firing high voltage edge 9a is designed to form a spark gap 9 close to a vertical orientation (with the ground spark firing inner edge 8b) to present the spark at approximately right angles to the preferred essentially horizontal air-flow, forcing the spark to move in the direction of the flow versus into the spark plug recess volume 24. Keeping the end surface 23a of insulator 23 as far as practical from the inner firing edge 8b helps attain this. Preferably, the minimum (horizontal) distance between the insulator surface 23a and the ground spark firing edge 8b is as large as practical (and larger than the spark gap 9). If the spark fires at the upstream side of the gap the design is such as to allow the spark to rotate to the downstream side and then run (move) along the spark rail 21.

A main feature of this spark plug is its spark gap 9 and arc runner design 21 and orientation with respect to the cylinder head and the engine air flow direction (shown as arrows in the preferred engine flow orientation). The air-flow is shown essentially parallel to the cylinder head inner surface 2a and preferably at an angle "z" between 45 and 90 degrees to the spark gap 9 and spark direction so as to move the initial spark 26a along the spark plug runner 21 in a direction away from the center of the plug as depicted by the later spark positions 26b and 26c. This has the two-fold benefit of moving the spark-initial flame front kernel 26a/26b/26c towards the center of the combustion chamber (see FIGS. 7a, 7b) and keeping the spark away from the end of the insulator section 23 to prevent deposits from forming on it. Therefore, an important aspect of the invention is the design of the spark plug end with respect to the cylinder head and design of the engine air-flows (under normally operating conditions) to produce a large stretched spark-initial flame kernel without break-up or segmentation of the spark and movement of the spark away from the central plug location towards the center of the combustion chamber, as depicted in FIGS. 7b and 7c. The spark plug end sections 20, 21, 8a, 8b are preferably made of high erosion resistant material such as Tungsten-Nickel-Iron.

Figure 7A:
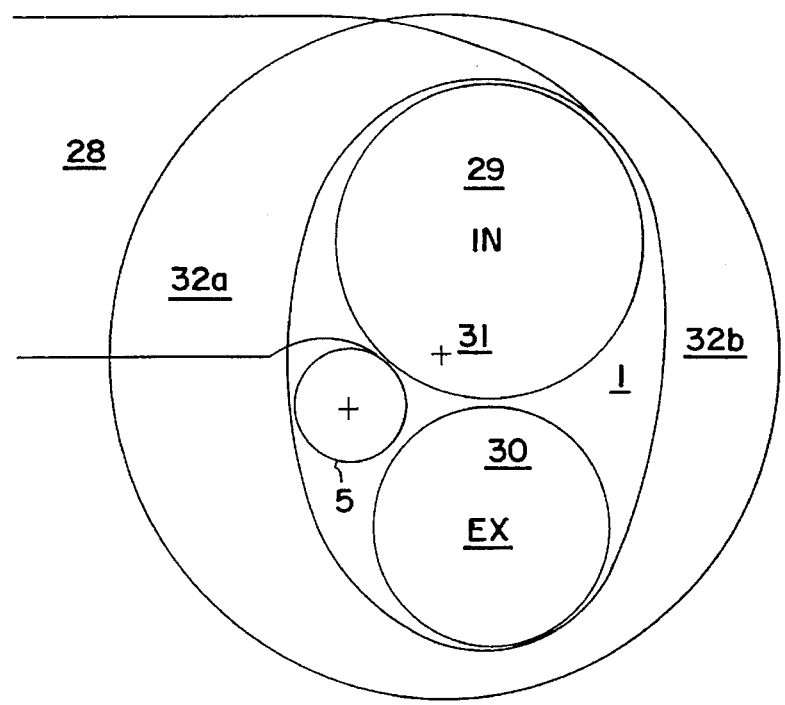
FIGS. 7a, 7b, 7c are a partial top view and two partial side views (at different piston crank angles) of a preferred combustion chamber design with squish and the combustion chamber mostly in the piston and some squish reinforcing tumble produced by the intake runner locations.
Figure 7B:
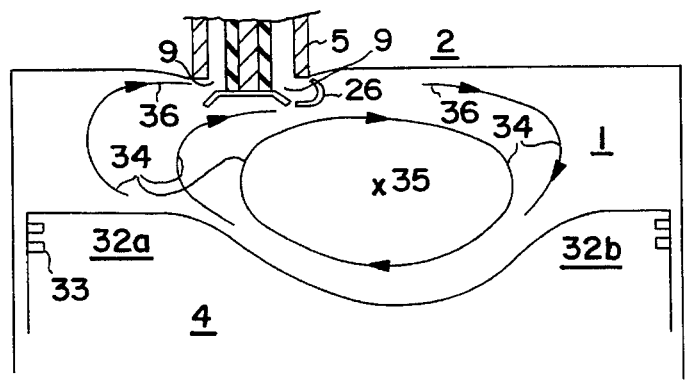
Figure 7C:
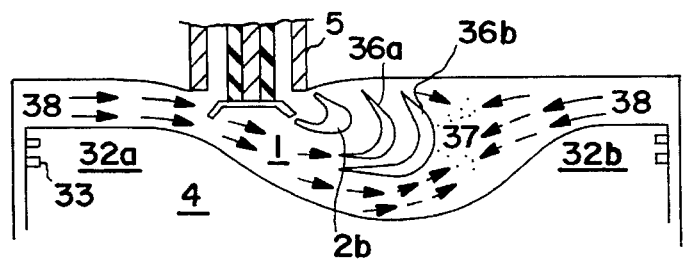

FIGS. 7a, 7b, 7c are a partial top view and two partial side views (at different piston crank angles) of a preferred combustion chamber design with spark plug location and with squish to produce the desired flows mentioned above with respect to the spark plug end and with respect to the location of the combustion chamber which is mostly in the piston. Preferably, the intake air-flow (intake runner 28 and intake valve 29 design) should create some tumble motion which reinforces the essentially horizontal squish motion, especially at earlier ignition timings where the horizontal component of the squish velocity may be reduced.

FIG. 7a is a top view of a preferred simpler two valve engine design for the present invention comprised of the two valves (smaller exhaust valve 30) located in an essentially flat head with the major part of the combustion chamber 1 formed essentially under the two valves in a somewhat central (but off-center portion of the piston 4). The valves are shown along a vertical line off-center from the piston center 31 to create asymmetrical squish, a high squish zone by the large piston land 32a and a smaller squish zone by the smaller piston land 32b. The spark plug 5 is shown located between the valves at the edge of the high squish inducing piston land 32b. Preferably, the piston rings 33 (FIGS. 7b, 7c) are close to the edge of the squish lands to reduce crevices and quench zones and hence hydrocarbon emissions.

FIGS. 7b and 7c depict the piston at approximately 45 degrees BTC and at approximately 15 degrees BTC, with like numerals representing like parts with respect to the earlier figures. In FIG. 7b is shown the preferred tumble air motion 34 with horizontal axis 35 showing the squish reinforcing tumble motion which is essentially a horizontal tumble-induced air-flow (flow vectors 36) at the top of the cylinder, moving through the spark plug gap 9 in a direction of the squish induced air-motion towards the center of the combustion chamber to move the initial spark kernel 26 towards the center of the combustion chamber. The tumble velocity gets progressively higher with timing advance as the squish velocity progressively decreases (beyond 10 to 20 degrees BTC depending on piston clearance), having the important squish reinforcing effect with timing advance at a constant speed (squish will increase with timing advance if the timing advance is associated with increased engine speed).

In FIG. 7c is shown a time history of the developing flame fronts 36a and 36b resulting from the stretched spark kernel 26, moving towards the high turbulence zone 37 (dotted region) where the squished air-flow from the major and minor squish zones (produced by the piston lands 32a and 32b respectively) collide to produce minimum bulk air motion and high turbulence (microscale turbulence). The progress of the flame front is slowed in this region, and as the piston reaches and moves beyond top center TC, the squish air-motion reverses and the flame fronts will now move outward towards the far ends 38 of the combustion chamber to complete the burn (at approximately 30 degrees after top center (ATC). The large mixture volume burnt from the spark plug gap 9 to the turbulent zone 37 represents a well defined and consistent burnt volume in time with respect to the piston motion to minimize cycle-to-cycle variation, especially at light loads where the maximum mixture dilution is preferred to minimize engine throttling (pumping) motion to maximize engine efficiency.

In essence, the spark plug with its location in the high bulk-flow squish region preferably reinforced with tumble or vertical vortex motion, and its intense DC spark which is immune to segmentation by the high bulk flow, combined with the combustion chamber shape and resulting squish and air-tumble motions, define an optimized spark ignited internal combustion (IC) engine system which must be viewed as a complete system capable of igniting highly dilute mixtures with low cycle-to-cycle variation for best engine efficiency and lowest emissions. For improving operation of the ignition spark (to allow for largest spark gap) and independently providing of high part load engine efficiency, the valve timing shown in FIG. 8 is preferred which has a late intake valve closure (IVC) approximately 75 degrees for low pumping loss and low effective compression ratio of approximately 8:1 (lower peak pressures at ignition for larger spark gap), but preferably a high expansion ratio of approximately 12:1 to offset the lower effective compression ratio. Preferably, small valve overlap is employed (20 degrees between intake valve opening, IVO, and exhaust valve closure, EVC) for minimum low speed HC emissions.

FIG. 9 shows the strategy of operating this preferred engine design in terms of maximum engine power as a function of engine speed starting with a reference case of a typical standard engine, which is modified in turn with 1) the cam design of FIG. 8, 2) a higher expansion ration (ER), and 3) with a dilution strategy to achieve essentially the same or slightly higher maximum power as the conventional engine but with higher levels of exhaust dilution, especially at higher speeds and WOT stoichiometric operation to minimize NOx emissions. The smaller valve overlap and smaller exhaust valve opening time increases the retained burnt gas at high speeds to give higher internal exhaust dilution at high speed WOT conditions where stoichiometric (versus rich) fuel-air ratio operation is preferred, reducing the peak temperatures (which maximize at stoichiometry) to prevent damage of the exhaust catalyst and reducing NOx emissions.

The effect of the cam (dash-dot line) on engine power is to reduce power at low speeds (lower volumetric efficiency) but increase power at high speeds relative to the standard engine (dash curve). The effect of the high expansion ratio (dash-double dot curve) is to increase power throughout the speed range. Finally, the effect of the higher internal (or externally supplied) exhaust dilution at higher speeds is to reduce the output power and create the final operating curve (solid line) which is comparable to the original curve except that the engine efficiency is higher, the NOx emissions are lower, and HC emissions at WOT are much lower through stoichiometric versus rich mixture operation, i.e. these important gains have been made without compromising the engine power. At part load, the engine efficiency is higher irrespective of cam design or higher expansion ratio by the nature of the invention, i.e. by the ability to operate the engine at leaner mixtures with lower cycle-to-cycle variation.

FIG. 10 is a table showing for three typical engine speeds, idle, low speed, and moderately high speed, the preferred air density behavior, the piston speed U(x), the typical squish velocity (without any reinforcing tumble), and a typical preferred air-fuel and gas-fuel ratio strategy for the proposed engine.

The piston speed U(x) is given by:

$$U(x)=H(x)*pi*S*RPM*\sin(x)$$

where x is the crank angle before top center (BTC), H(x) is a slowly varying function of x which varies between 1 and (1+S/(2*L)) and 1 from 90 degrees to 0 degrees BTC respectively (S being the piston stroke and L is the connecting rod length), pi=3.142, RPM is the engine speed, and "*" indicates multiplication.

Typically, S/(2*L) is approximately ⅕, so that in the range of 10 to 30 degrees BTC we can take H(x) as to equal 1.2. Special cases for the piston speed are the maximum piston speed U(max) (occurring at 90 degrees BTC) and the average piston speed U(ave), given by:

$$U(\max)=pi*S*RPM=(2/pi)*U(ave)$$

An approximate expression for the squish velocity Vsq(x) is given by:

$$Vsq(x)=F(y)*(b/h)*(Vbowl/Vtot)*U(x)$$

$$F(y)=(1-y**2)/(4*y)$$

where b is the cylinder bore, h is the clearance (at a particular crank angle x) between the piston land 32a (and 32b) and the cylinder head in the squish zone, y=d/b where d is the bowl diameter, Vbowl is the volume in the (piston) bowl, and Vtot is volume of the combustion chamber at a particular crank angle x.

The clearance height h(x) for small crank angles BTC is approximately:

$$h(x)=h(0)+(S/4)*[1+S/(2*L)]*[\sin(x)]**2$$

where h(0) is the clearance at TC.

From these equations one can construct the values of piston speed U(x) and the approximate squish velocity Vsq(x) at the speed and ignition timings (IGT) shown, assuming a 3" bore (b) and stroke (S), y=⅔ and hence F(y)=0.2, h(0)=0.01*b, and an expansion ratio of 12:1 which gives approximately:

$$Vbowl/Vtot(x)=(S/11)/[(S/11)+h(x)]$$

Inspection of the table shows a squish velocity of 4 m/sec at idle speed to help spread and direct the ignition spark-initial flame front kernel, as discussed, and a value of squish velocity approximately twice that at the higher speeds and at the ignition timings shown. Hence, the flows past the plug are higher than normal, but do not vary widely as is preferred, although a gradual increase with engine speed is desirable because of the shorter available combustion time available at high engine speeds. With squish reinforcing tumble motion which, say, may double or more the essentially preferred horizontal air velocity at the spark plug site at ignition, the flow velocities will be in the preferred range of approximately 10 to 20 m/sec which will produce extensive spreading of the ignition spark-initial flame kernel for more dilute combustion capability and lower cycle-to-cycle variation.

For the preferred late intake valve closure the density of air (or pressure corrected to inlet air temperature and indicated as "Pressure*") in the combustion chamber at ignition remains approximately constant at WOT with engine speed as indicated in the table because the ignition timing speed advance essentially compensates for the higher volumetric efficiency at the higher speeds (the higher fill of the combustion chamber around 3000 RPM). This permits a larger spark gap 9, preferably 0.08" or larger as determined by the ignition output voltage (which for hybrid ignition is between 30 kV to 42 kV depending on design).

In the table is indicated preferred air-fuel ratio (AFR) and gas-fuel ratio (GFR) strategies at light, medium, and WOT at the three engine speeds. At light load the strategy is to run the engine with the maximum dilution, i.e. pure air dilution for maximum leanness for best engine efficiency; at medium load one can operate with pure air, pure exhaust, or a combination air/exhaust gas dilution depending on the desired trade-off between engine efficiency and NOx emissions (pure air dilution is indicated at the low speed and pure exhaust dilution at stoichiometry at the high speed); and at WOT stoichiometric operation is used with small levels of dilution as discussed with reference to FIG. 9.

There are many variations to the "flow coupled spark discharge" in terms of combustion chamber, flow configuration, spark plug location, tip orientation, spark discharge characteristics, etc. On can use a suitably designed swirl flow field properly directed through the spark gap of a suitable spark discharge to produce the strong flow coupled spark discharge. Or one can fire the plug to the piston top as disclosed in prior patents and design the flow field to traverse the spark discharge in the desired direction, i.e. toward the center of the combustion chamber. Or one can use different plug tips and orientations to produce the disclosed effects. However, care must be taken to insure that the spark kernel moves away and outward from the center of the spark plug into the combustion chamber to both be more effective and to prevent premature spark plug fouling.

A different example where flow coupled discharge may be effective is in the rotary engine where the sweeping action of the rotor may be particularly well suited for producing the desired flows in a properly designed, located, and oriented spark plug. Or one may direct the squish flow somewhat downwards as indicated in FIG. 7c to counter the piston induced vertical flow component which may tend to move the spark kernel in the undesired direction into the plug recess volume (24). Or one may have a system with externally variable control of tumble, swirl, or combinations of flows to produce the desired intensity and direction of flow past the spark plug gap under most, or all, operating conditions of the engine.

One can also employ existing engine designs with small modifications to achieve some degree of improvement, such as spark plug relocation, intensifying of the squish motion with the plug near the squish zone, introduction of tumble motion to create bulk flow at the spark plug site, and other modifications.

It is therefore particularly emphasized with regard to the present invention, that since certain changes may be made in the above apparatus and method without departing from the scope of the invention herein disclosed, it is intended that all matter contained in the above description, or shown in the accompanying drawings, shall be interpreted in an illustrative and not limiting sense.

What is claimed is:

1. In an internal combustion, IC, engine including means for forming at least one combustion chamber, means for forming an air-fuel mixture therein, means for cyclically igniting said mixture, the latter means including at least one igniter element in contact with the chamber's air fuel mixture contents and means for energizing said igniter element to produce a mixture igniting spark discharge at the spark firing end of said igniter element, the improvement comprising:

an engine constructed and arranged to have its combustion chamber mainly in a central portion of the piston in the form of a smooth bowl with the rim of the bowl defining a piston land to the outer edge of the piston, wherein the piston land induces essentially centrally directed squish motion as it approaches TC and wherein said igniter element has its most centrally oriented region of its spark gap in a position between the position of the rim of the piston (referenced to the TC piston position) and the center of the piston bowl to provide some squish flow at the spark plug site essentially perpendicular to the spark gap and spark kernel to stretch the spark and move it towards the center of the combustion chamber without break up or segmenting of the main spark energy delivery portion of said spark discharge under most normal operating conditions of the engine and helping spread the flame into the combustion chamber.

2. Method of maintaining a cyclic, spark ignited combustion, comprising the steps of: (a) cyclically flowing an air-fuel mixture of high dilution along a selected traversing dimension of a combustion zone, (b) creating a high power spark discharge of arc discharge type in the air-fuel mixture flow to create a directed flame front kernel therein, and (c) maintaining the flow and discharge conditions such that, within most discharge firing cycles, the directed flame front kernel traverses at least ⅓ of said selected length, the discharge power being at least 100 watts, its duration at least 100 usecs, and its energy at least 20 mj whereby each discharge couples to the flow and takes on a form elongating downstream without spark segmentation for a majority of the discharge duration.

3. Apparatus for maintaining a cyclic, spark ignited combustion, comprising:

(a) means defining a combustion zone; (b) means for cyclically flowing an air-fuel mixture along a selected traversing dimension of said combustion zone, (c) means for creating a high power spark discharge of arc discharge type in the air-fuel mixture flow to create a time front kernel therein, and (d) means for maintaining the flow and discharge conditions such that, within most discharge firing cycles, the flame front kernel traverses at least ⅓ the said selected length, the spark discharge power is in excess of 100 watts, the discharge duration is at least 100 microseconds, and the discharge provides at least 20 millijoules of spark discharge energy to the mixture, whereby each spark discharge couples to the flow which takes on a form of stretch-elongation downstream moving downstream in the flow without segmentation or break-up for a majority of the discharge duration.

4. Apparatus in accordance with claim 3 wherein said means for creating spark discharge comprises a hybrid ignition system with an essentially continuous principally arc discharge type of spark.

5. Apparatus in accordance with claim 3 as a compression-expansion, internal combustion engine wherein said means for flowing comprises means for inducing squish motion gas flow of the air-fuel mixture in a combustion region thereof and said means for creating discharge comprises a spark firing end within the area of squish motion of the mixture.

6. Apparatus in accordance with claim 3 as a compression-expansion, internal combustion engine wherein said means for flowing comprises means for creating tumble or vertical vortex flow of the air-fuel mixture in a combustion region thereof and said means for creating discharge comprises a spark firing end within the area of tumble motion of the mixture.

7. Apparatus in accordance with claim 3 as a compression-expansion, internal combustion engine wherein said means for flowing comprises means for inducing squish motion gas flow and tumble motion of the air-fuel mixture in a combustion region thereof and said means for creating discharge comprises a spark firing end within the area of squish motion of the mixture and whereby the flow direction of the tumble motion at the site of said spark firing end during the time of ignition is in essentially the same direction as the squish induced flow.

8. Apparatus in accordance with claim 7 wherein said spark firing end provides a spark gap length or axis which is greater than 45 degrees to the direction of said flow for most normal operating conditions of said engine.

9. Apparatus in accordance with claim 3 as a compression-expansion, internal combustion engine wherein said means for creating discharge comprises a spark firing end within the area of flow of the mixture such that the flow ultimately directs the spark discharge outward and away from the spark firing end which may initially start the spark discharge at an upstream side of the firing end.

10. Apparatus in accordance with claim 9 wherein said spark firing end provides a toroidal or circular type spark gap formed from a disk like high voltage electrode and a circular ground electrode of gap length or axis which is greater than 45 degrees to the direction of said flow for part of the perimeter of said circular or toroidal gap for most normal operating conditions of said engine such that the flow moves the spark discharge in a direction of the flow.

11. Apparatus in accordance with claim 10 wherein said spark firing end is a spark plug and wherein said high voltage electrode is a disk shaped with contoured end section which form a larger gap with the ground electrode such that the initial spark breakdown occurs at an interior point of said disk electrode and moves ultimately outward along said contoured section which acts as a runner for the spark kernel to move along in the general direction of the flow.

12. In an internal combustion, IC, engine including means for forming at least one combustion chamber, means for forming an air-fuel mixture therein, means for cyclically igniting said mixture, the latter means including at least one igniter element in contact with the chamber's air fuel mixture contents and means for energizing said igniter element to produce a mixture igniting spark discharge at the spark firing end of said igniter element, the improvement comprising:

means for producing bulk flow of the air-fuel mixture at the spark firing end of said igniter element during the time of ignition for most normal operating conditions of the engine such that the mixture is ignited by the spark discharge, and for moving the spark discharge and the initial flame formed from said spark discharge in a direction toward a central region of said combustion chamber in part as a result of said mixture flow, and wherein motion of said spark discharge is achieved at least, in part, by elongation or stretching of said spark discharge without break up or segmenting of the main spark energy delivery portion of said spark discharge.

13. The engine as defined in claim 12 wherein said mixture flow traverses a spark firing discharge gap of said igniter element in a direction more perpendicular than parallel to the length axis of said gap or shortest path defining said gap so as to produce a stretching and/or moving of said spark discharge.

14. The engine as defined in claim 12 wherein said spark discharge has a peak spark current of about one amp or greater and a spark duration of greater than 100 microseconds (usec).

15. The engine as defined in claim 14 wherein said means for ignition comprises a hybrid ignition system characterized by an essentially continuous spark discharge which resists break up or segmentation under high flow conditions.

16. The engine as defined in claim 14 wherein said spark discharge delivers to said spark gap spark power in excess of 100 watts under high flow conditions.

17. The engine as defined in claim 4 wherein said engine has two valves and said igniter element is located in a space between said valves and adjacent to the valves and wherein engine combustion chamber is contained mainly in the piston as a bowl-in-piston and wherein the high section or lands of the piston which induce squish motion near TC are constructed to have the largest squish inducing piston land adjacent to said igniter element.

18. The engine as defined in claim 17 constructed and arranged such that the maximum squish velocity near the spark plug gap is at least 1 m/sec under the normally quiescent idle engine conditions.

19. The engine as defined in claim 14 wherein said igniter element is a spark plug with a threaded ground shell and spark firing discharge gap which is toroidal and circular, defined by a central, essentially flat, high voltage disc electrode extending beyond the cylinder head surface and spark plug shell end, and forming the spark gap with said shell end, and wherein said disc electrode is essentially parallel to the cylinder head interior surface of the engine.

20. The engine as defined in claim 19 wherein said high voltage disc electrode comprises an inner portion flat disk and an arc runner outer portion making an angle of 30 to 60 degrees to the inner disk section and oriented away from the cylinder head surface and forming an essentially circular spark firing edge at the inner intersection of said inner and outer portions of said electrode.

21. The engine as defined in claim 19 wherein said spark gap is equal to or greater than 0.080".

22. The engine as defined in claim 19 wherein said central high voltage disc electrode is made of high erosion resistant material and the center axial conductor is partially or essentially totally made of copper which is well heat sunk to minimize heating of said central disc electrode.

23. The engine as defined in claim 22 wherein said spark plug center disk electrode is made of tungsten-nickel-iron.

24. The engine as defined in claim 22 wherein said spark plug is an 18 mm plug.

25. The engine as defined in claim 19 wherein said spark plug is placed adjacent to a zone in a combustion chamber which creates squish flow as the piston approaches top center, TC, and wherein said squish flow traverses said spark gap to stretch said spark toward a more central portion of the combustion chamber.

26. The engine as defined in claim 25 wherein said combustion chamber at TC is defined essentially entirely by a bowl in the piston and the cylinder head is essentially flat with said spark plug located in a region near the lip of the bowl where the squish flows are high.

27. The engine as defined in claim 26 wherein intake valve closing is delayed relative to a standard engine to produce reduced effective compression ratio of approximately 8 to 1 and wherein the expansion ratio is approximately 12 to 1.

28. The engine as defined in claim 26 wherein the intake air dilution at low speeds and light load is primarily by air, at high speeds and high loads is primarily by exhaust gas at a stoichiometric air-fuel ratio, and at wide open throttle, WOT, and high speed it is with exhaust gas at low levels of dilution of about 10% of the air for stoichiometric air-fuel ratio operation.

29. The engine as defined in claim 26 wherein tumble or vertical vortex flow is employed with the squish flow such that the tumble flow at the spark plug site reinforces the squish flow before TC so that at more advanced ignition timings when the squish flow is low the tumble flow will be high for a less wide variation in the flow velocities past the plug.

30. The engine as defined in claim 29 wherein the flow velocities at the spark plug site range between a few meters per second, m/sec, up to about 20 m/sec at high engine speeds.

\* \* \* \* \*